Patented Dec. 12, 1950

2,534,112

UNITED STATES PATENT OFFICE 2,534,112

CERTAIN THIO DERIVATIVES OF ALPHA ALKYLIDENE CYANOACETIC ESTERS

Harry Derek Edwards, Ilford, England, assignor to Ilford Limited, Ilford, England, a British company No Drawing. Application September 22, 1949, Serial No. 117,265. In Great Britain October 2, 1948

9 Claims. (Cl. 260—465)

This invention relates to the production of organic sulphur derivatives which are useful as intermediates for the formation of dyestuffs.

When a compound of the general formula:

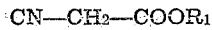

where $R_1$ is an alkyl group is reacted, preferably in the form of its alkali metal derivative, with an acyl halide of the general formula:

where $R_2$ is an alkyl group and X is a halogen atom, e. g. chlorine or bromine, a compound of the formula

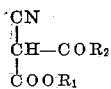

is obtained. According to the present invention a compound of the said formula, preferably produced by the said process, is reacted with an alkyl or aralkyl mercaptan of the general formula $R_3SH$, preferably in the presence of an acid catalyst.

The course of the reactions is believed to be as follows (M is an alkali metal):

Stage I

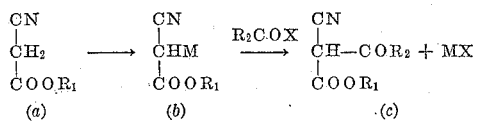

Stage II

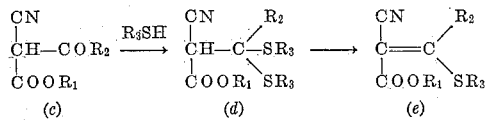

The compound (d) is not isolated. The final product (e) is an intermediate of great reactivity since both the group $R_2$ and the group $SR_3$ are reactive. It will be appreciated that it may sometimes be obtained in the stereo isomeric form

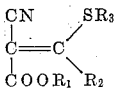

Processes for the production of dyestuffs from this type of intermediate are described in co-pending applications Serial Nos. 117,266, 117,267 and 117,268 filed on even date herewith.

The groups $R_1$ and $R_2$ may be any alkyl groups, e. g. alkyl groups containing 1 to 12 carbon atoms, such as methyl, ethyl, hexyl, octyl and dodecyl groups. The group $R_3$ may be any of the foregoing alkyl groups, or may be an aralkyl group, e. g. benzyl or naphthylmethyl.

The most convenient intermediates to prepare according to this invention are those in which $R_2$ is a methyl group since acetyl halides, and especially acetyl chloride, are readily accessible reagents. The group $R_1$ is also preferably a methyl or ethyl group since the initial starting materials cyanacetic methyl ester and cyanacetic ethyl ester are commercially available. Thus the preferred intermediates produced according to this invention have the formula:

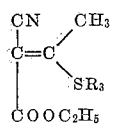

or

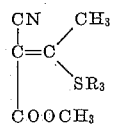

It is to be understood, however, that the invention is not restricted to the production of these compounds. As already indicated, it is preferred to start with the alkali metal derivative of the original cyanacetic ester, i. e. with a compound of type (b), and whilst any alkali metal may be employed, sodium is preferred. It is also of great assistance to carry out the reactions under substantially or completely anhydrous conditions.

The acid condensing agent may be any strongly acidic substance, but sulphuric acid and zinc chloride have been found to be particularly suitable.

The following examples will serve to illustrate the invention:

EXAMPLE 1

*Stage I.—Preparation of ethyl α-cyano-aceto-acetate*

Cyanoacetic ester (56.5 gms.; 0.5 mol.) was slowly added with stirring to powdered sodium (11.5 gms.; 0.5 mol.) suspended in dry ether (400 cc.), stirred for a further 6 hours and allowed to stand for 12 hours. Acetyl chloride (39.2 gms.; 0.5 mol.) was then added with cooling and vigorous stirring over 45 minutes. Stirring was continued for a further hour whilst the solution warmed up to room temperature. The reaction mixture was then filtered to separate sodium salts and the filtrate was concentrated. The residual oil was then distilled under vacuum, to give the product, B. P. 115° C. at 2 mm. pressure.

Stage II.—*Preparation of ethyl 2-cyano-3-ethylthio-2-butenoate*

Ethyl α-cyano-acetoacetate (7.75 gms.; 0.05 mol.) was placed in a flask with ethyl mercaptan (4.88 gms.; 0.075 mol.) and surrounded by an ice/salt freezing mixture. The mixture was diluted with 10 cc. dry ether and then 20 cc. dry ether containing a trace of hydrochloric acid gas was added and the mixture allowed to stand for two hours. Anhydrous zinc chloride (3.41 gms.; 0.025 mol.) was then added. After two hours the flask was removed from the cooling bath and allowed to stand for 48 hours. A small water layer which formed was separated off. The ether solution was washed with ammonium chloride solution, then with sodium bicarbonate solution and finally with water. After drying over potassium carbonate the solution was concentrated and the residual oil distilled under reduced pressure. B. P. 138–141° C.

EXAMPLE 2

Stage I.—*Preparation of methyl α cyano aceto acetate*

Methyl cyanoacetate (99 gms.; 1 mol.) was added to powdered sodium (23 gms.; 1 mol.) in dry ether (1000 cc.) in a 3-litre flask fitted with a reflux condenser, dropping funnel and a sealed mechanical stirrer. The mixture was stirred throughout the addition which took 2 hours. Stirring was continued for a further 6 hours and the flask and contents were then allowed to stand at room temperature for 4 days.

The flask was then surrounded with iced water and acetyl chloride (78.5 gms.; 1 mol.) was added in 1 hour with stirring. The flask and contents were then allowed to stand at room temperature for a further 4 days.

The mixture was then filtered, the ether distilled off from the filtrate and the residual oil distilled in vacuo. The product had B. P. 117–119° C. at 2.5 mm. pressure.

Stage II.—*Preparation of methyl-2-cyano-3-ethylthio-2-butenoate*

Ethyl mercaptan (9 gms.) was added to methyl α cyano aceto acetate (20.1 gms.) in dry ether (200 cc.). Anhydrous zinc chloride (10 gms.) was added and the mixture allowed to stand at room temperature for 48 hours.

The mixture was extracted with ether and the ether solution was washed and dried over potassium carbonate. The ether was distilled off and the residual oil crystallised on cooling. M. Pt. 52° C.

Crystallisation from methyl alcohol gave M. Pt. 64° C. Recrystallisation from methyl alcohol gave M. Pt. 66° C.

EXAMPLE 3

*Preparation of ethyl-2-cyano-3-isopropylthio-2-butenoate*

Isopropyl mercaptan (8.5 gms.) was added to ethyl α cyano aceto acetate (17.2 gms.), prepared as in Example 1, Stage I, dissolved in dry ether (100 cc.) in a 250 cc. flask. Anhydrous zinc chloride (14 gms.) was then added and the mixture allowed to stand at room temperature for 48 hours.

The mixture was then extracted with ether and the ether solution washed and dried over potassium carbonate. The ether was distilled off and the residual oil distilled in vacuo. The product had B. P. 148–149° C. at 0.5 mm. pressure.

EXAMPLE 4

*Preparation of ethyl-2-cyano-3n.butylthio-2-butenoate* n.Butyl mercaptan (10 gms.) was added to ethyl α cyano aceto acetate (17.2 gms.), prepared as in Example 1, Stage I, dissolved in dry ether (100 cc.) in a 250 cc. flask. Anhydrous zinc chloride (14 gms.) was then added and the mixture allowed to stand at room temperature for 48 hours.

The mixture was then extracted with ether and the ether solution washed and dried over potassium carbonate. The ether was distilled off and the residual oil distilled in vacuo. The product had B. P. 159–163° C. at 0.5 mm. pressure.

EXAMPLE 5

*Preparation of ethyl-2-cyano-3-benzylthio-2-butenoate*

Benzyl mercaptan (12.4 gms.; .1 mol.) was added to ethyl α cyano aceto acetate (15.5 gms.; .1 mol.), prepared as in Example 1, Stage I, in dry ether (100 cc.) in a 250 cc. flask. Anhydrous zinc chloride (13.6 gms.; .1 mol.) was then added and the mixture allowed to stand at room temperature for 48 hours.

The mixture was then extracted with ether and the ether solution washed and dried over potassium carbonate. The ether was distilled off and the residual oil distilled in vacuo until the temperature of the distillate reached 190° C. at 1.5 mm. pressure.

On cooling the residual oil crystallised. M. Pt. 83° C. Crystallisation from methyl alcohol gave M. Pt. 90.5° C.

EXAMPLE 6

*Preparation of methyl-2-cyano-3-methylthio-2-butenoate*

Methyl mercaptan (8.5 gms.) was added to methyl α cyano aceto acetate (20.1 gms.), prepared as in Example 2, Stage I, in dry ether (100 cc.). Anhydrous zinc chloride (10 gms.) was added and the mixture allowed to stand at room temperature for 48 hours.

The mixture was extracted with ether and the ether solution was washed and dried over potassium carbonate. The ether was distilled off and the residual oil crystallised on cooling. M. Pt. 103° C.

Crystallisation from methyl alcohol gave M. Pt. 119° C. Recrystallisation from methyl alcohol gave M. Pt. 120° C.

What I claim is:

1. Process for the production of organic sulphur compounds of the general formula:

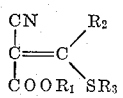

and stereo isomeric forms thereof which comprises reacting a compound of the general formula:

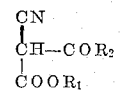

with a mercaptan of the formula $R_3SH$ where $R_1$ and $R_2$ are alkyl groups and $R_3$ is selected from the class consisting of alkyl and aralkyl groups.

2. Process for the production of organic sulphur compounds of the general formula:

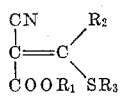

and stereo isomeric forms thereof which comprises reacting a compound of the general formula:

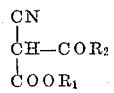

with a mercaptan of the formula R₃SH where R₁ and R₂ are alkyl groups and R₃ is selected from the class consisting of alkyl and aralkyl groups, the reaction being effected in the presence of an acid condensing agent.

3. Process for the production of organic compounds of the general formula:

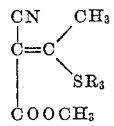

and stereo isomeric forms thereof which comprises reacting methyl α-cyano-acetoacetate with a mercaptan of the formula R₃SH where R₃ is selected from the class consisting of alkyl and aralkyl groups, the reaction being effected in the presence of an acid condensing agent in substantially anhydrous conditions.

4. Process for the production of organic compounds of the general formula:

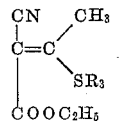

and stereo isomeric forms thereof which comprises reacting methyl α-cyano-acetoacetate with a mercaptan of the formula R₃SH where R₃ is selected from the class consisting of alkyl and aralkyl groups, the reaction being effected in the presence of an acid condensing agent in substantially anhydrous conditions.

5. Process for the production of organic compounds of the general formula:

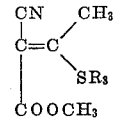

and stereo isomeric forms thereof which comprises reacting methyl α-cyano-acetoacetate with a mercaptan of the formula R₃SH where R₃ is selected from the class consisting of alkyl and aralkyl groups, the reaction being effected in the presence of zinc chloride in substantially anhydrous conditions.

6. Process for the production of organic compounds of the general formula:

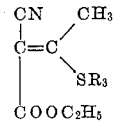

and stereo isomeric forms thereof which comprises reacting methyl α-cyano-acetoacetate with a mercaptan of the formula R₃SH where R₃ is selected from the class consisting of alkyl and aralkyl groups, the reaction being effected in the presence of zinc chloride in substantially anhydrous conditions.

7. Organic compounds of the general formula:

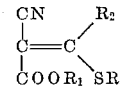

and stereo isomeric forms thereof, where R₁ and R₂ are alkyl groups and R₃ is selected from the class consisting of alkyl and aralkyl groups.

8. Organic compounds of the general formula:

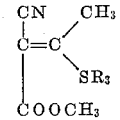

and stereo isomeric forms thereof, where R₃ is selected from the class consisting of alkyl and aralkyl groups.

9. Organic compounds of the general formula:

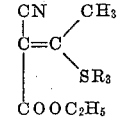

and stereo isomeric forms thereof, where R₃ is selected from the class consisting of alkyl and aralkyl groups.

HARRY DEREK EDWARDS.

REFERENCES CITED

The following references are of record in the file of this patent:

FOREIGN PATENTS

| Number | Country | Date |
|---|---|---|
| 610,569 | Great Britain | Oct. 18, 1948 |

OTHER REFERENCES

Haller, Beilstein (Handbuch, 4th ed.), vol. 3, page 471 (1921).

Vila et al., Chemical Abstracts, vol. 39, col. 4329 (1945).